United States Patent
Prissok et al.

(12)

(10) Patent No.: US 11,072,692 B2
(45) Date of Patent: Jul. 27, 2021

(54) HOLLOW PARTICLE MADE OF THERMOPLASTIC ELASTOMERS AND POROUS MOULDED BODIES

(71) Applicant: BASF SE, Ludwigshafen am Rhein (DE)

(72) Inventors: Frank Prissok, Lemfoerde (DE); Juergen Ahlers, Ludwigshafen am Rhein (DE)

(73) Assignee: BASF SE, Ludwigshafen (DE)

( * ) Notice: Subject to any disclaimer, the term of this patent is extended or adjusted under 35 U.S.C. 154(b) by 250 days.

(21) Appl. No.: 16/303,497

(22) PCT Filed: May 22, 2017

(86) PCT No.: PCT/EP2017/062298
§ 371 (c)(1),
(2) Date: Nov. 20, 2018

(87) PCT Pub. No.: WO2017/202782
PCT Pub. Date: Nov. 30, 2017

(65) Prior Publication Data
US 2020/0317882 A1    Oct. 8, 2020

(30) Foreign Application Priority Data
May 25, 2016  (EP) .................... 16171208

(51) Int. Cl.
*C08J 9/18* (2006.01)
*C08J 9/24* (2006.01)
*C08J 5/12* (2006.01)
*C08J 9/12* (2006.01)

(52) U.S. Cl.
CPC ............... *C08J 9/18* (2013.01); *C08J 5/121* (2013.01); *C08J 9/122* (2013.01); *C08J 9/24* (2013.01); *C08J 2203/06* (2013.01); *C08J 2207/02* (2013.01); *C08J 2325/10* (2013.01); *C08J 2367/00* (2013.01); *C08J 2375/04* (2013.01); *C08J 2377/02* (2013.01)

(58) Field of Classification Search
CPC ....... C08J 9/122; C08J 9/16; C08J 9/24; C08J 9/32; C08J 2207/02; C08J 2300/22; C08J 2300/26; C08J 2353/02; C08J 2367/00; C08J 2375/00; C08J 2377/00; C08J 2400/22; C08J 2400/26; C08J 2453/02; C08J 2467/00; C08J 2475/00; C08J 2477/00; C08J 9/18; C08J 5/121; C08J 2203/06; C08J 2325/10; C08J 2375/04; C08J 2377/02; C09J 5/08
See application file for complete search history.

(56) References Cited

U.S. PATENT DOCUMENTS

| | | | |
|---|---|---|---|
| 3,605,294 A | 9/1971 | Cunningham et al. | |
| 2002/0193459 A1 | 12/2002 | Haseyama et al. | |
| 2013/0180131 A1* | 7/2013 | Schwartz | A43B 23/07 36/88 |

FOREIGN PATENT DOCUMENTS

| | | | |
|---|---|---|---|
| CN | 204070799 | * | 1/2015 |
| DE | 196 49 796 A1 | | 6/1998 |
| DE | 10 2006 046 868 A1 | | 7/2008 |
| EP | 0 451 535 B1 | | 6/1995 |
| EP | 0 697 274 B1 | | 7/2001 |
| GB | 1 458 576 | | 12/1976 |
| JP | 2007-238958 | | 9/2007 |
| RU | 2 207 353 C2 | | 6/2003 |
| RU | 2 371 456 C2 | | 10/2009 |
| WO | 2004/081311 | | 9/2004 |
| WO | WO 2007/022338 A1 | | 2/2007 |
| WO | WO 2007/082838 A1 | | 7/2007 |
| WO | WO 2008/087078 A1 | | 7/2008 |

OTHER PUBLICATIONS

Machine translation of CN 204070799, Jan. 2015.*
International Preliminary Report on Patentability and written Opinion dated Nov. 29, 2018 in corresponding PCT/EP2017/062298 (English translation only).
Muskopf, J.W., et al., "Epoxy Resins", Ullmann's Encyclopedia of Industrial Chemistry (Wiley), Edition 6, vol. 12, 2003, pp. 285-303.
Dieterich, D., et al., "Polyurethanes", Ullmann's Encyclopedia of Industrial Chemistry (Wiley), Edition 6, vol. 28, 2003, pp. 667-722.
Krämer, H., "Polyester Resins, Unsaturated", Ullmann's Encyclopedia of Industrial Chemistry (Wiley), Edition 6, vol. 28, 2003, pp. 65-74.
Polyurethanes, Encyclopedia of Polymer Science and Technology (Wiley), Edition 3, vol. 4, 2003, pp. 26-72.
Polyesters, Unsaturated; Encyclopedia of Polymer Science and Technology (Wiley), Edition 3, vol. 11, 2004, pp. 41-64.
Epoxy Resins, Encyclopedia of Polymer Science and Technology (Wiley), Edition 3, vol. 9, 2004, pp. 678-804.
International Search Report dated Jul. 13, 2017 in PCT/EP2017/062298 filed on May 22, 2017.

* cited by examiner

Primary Examiner — Irina S Zemel
(74) Attorney, Agent, or Firm — Grüneberg and Myers PLLC

(57) ABSTRACT

Hollow beads having a skin of thermoplastic elastomer and a gas-filled cell are useful in the manufacture of shaped porous articles by thermally bonding or adhering the hollow beads together.

13 Claims, No Drawings

HOLLOW PARTICLE MADE OF THERMOPLASTIC ELASTOMERS AND POROUS MOULDED BODIES

The present invention relates to hollow beads having a skin of thermoplastic elastomer and a gas-filled cell, processes for producing shaped porous articles by thermally bonding or adhering the hollow beads together, and the shaped porous articles obtainable therefrom.

High-resilience closed-cell foams, such as bead foams in thermoplastic polyurethane are described in WO 2007/082838 for example. The moldings obtained by fusion of foam beads display good mechanical properties and high levels of rebound resilience. The thickness of the outer skin of the foam beads has an appreciable bearing on the mechanical properties of the foam molding. The scope for varying the cell wall thickness and the ratio of cell wall thickness to internal cellular construction is but minimal because of the method of production. Higher wall thicknesses are thus tantamount to higher density.

Hybrid systems formed from foamed thermoplastic elastomers (TPEs) and polyurethanes are known from WO 2008/087078. They are obtainable by foam beads being adhered together and/or foamed in using PU binders or PU system foams.

EP 0 697 274 B1 describes open-cell expansion-molded articles in a polyolefin resin which are obtainable by fusing together tubular foamed particles having a through-hole.

WO 2007/022338 describes a shoe having a midsole comprising a cushioning element in the form of a liquid-filled bag in, for example, thermoplastic polyurethane.

Bags filled with liquids or gas (airbags) when used as cushioning elements, however, have the disadvantage that, owing to the sheer size of the chambers, the pressure distribution is uneven and damage to one chamber renders the entire cushioning element unusable.

The problem addressed by the present invention is therefore that of remedying the recited disadvantages and of providing hollow beads that are processable into shaped porous articles which combine a low density with a high level of compression load deflection, a high level of rebound resilience and a low level of compression set.

We have found that this problem is solved by hollow beads having a skin of thermoplastic elastomer and a gas-filled cell.

Hollow Beads

The bulk density of the hollow beads used is preferably in the range from 30 to 500 kg/m$^3$ and more preferably in the range from 50 to 350 kg/m$^3$.

Mean particle sizes $d_m$ of the hollow beads are preferably in the range from 2.5 to 25 mm and more preferably in the range from 5 to 15 mm. Sieve analysis can be used to determine the particle sizes. The hollow beads are employable in monomodal, bimodal or multimodal distribution. Particles having different sizes and shapes may be generated in the process for producing the hollow beads. Mean bead diameter is generally in the range from 2.5 mm up to 25 mm, preferably in the range from 3 to 20 mm, and more preferably in the range from 5 to 15 mm. The mean bead diameter may be determined, for example, by measuring 100 particles and forming the mean value, or by sieve analysis. The particles can be classified according to size by sieving using different sieves. The particles can thus be separated into so-called sieved fractions.

The particle size of the hollow beads has an appreciable bearing on the mechanical properties of the shaped porous article, but also on the amount of binder needed. The smaller the hollow beads and the greater the ratio of wall thickness to diameter, the higher the levels achievable for compressive strength, modulus of elasticity, thermal conductivity and density. In addition, a larger amount of binders is required on account of the larger surface area.

The skin of the hollow beads is preferably from 0.02 to 2 mm and more preferably from 0.05 to 1 mm in wall thickness.

The hollow beads each contain one gas-filled cell. The volume of these cells is preferably in the range from 1 to 10 000 mm$^3$ and more preferably in the range from 10 to 5000 mm$^3$ and most preferably in the range from 100 to 1000 mm$^3$.

Useful thermoplastic elastomers include, for example, thermoplastic polyurethanes (TPUs), thermoplastic polyester elastomers (e.g., polyether esters and polyester esters), thermoplastic block copolyamides (e.g., PEBA polyether block amides formed of PA12 segments and polyether segments) or thermoplastic styrene-butadiene block copolymers. Particular preference is given to hollow beads based on thermoplastic polyurethane (TPU).

The thermoplastic elastomers employed to produce the hollow beads preferably have a Shore hardness in the range from 25 A to 82 D, preferably in the range from 30 A to 80 D and more preferably in the range from 65 A to 96 A, as determined to DIN 53505.

It is preferred to employ thermoplastic polyurethanes (TPUs) to produce the hollow beads.

The TPUs employed are preferably based on polyether alcohol, more preferably polyether diol. Polytetrahydrofuran is considered with particular preference. The TPU is based with particular preference on polytetrahydrofuran having a molecular weight between 600 g/mol and 2500 g/mol. The polyether alcohols are employable in admixture with each other as well as individually.

Good results are alternatively obtained with TPU based on polyester alcohol, preferably polyester diol, preferably based on adipic acid and 1,4-butanediol, having a molecular weight between 600 g/mol and 3000 g/mol.

Thermoplastic polyurethanes and their methods of making are common general knowledge. TPUs are obtainable for example by reacting (a) isocyanates with (b) isocyanate-reactive compounds having a molecular weight of 500 to 10 000 and optionally (c) chain-extending agents having a molecular weight of 50 to 499 in the presence or absence of (d) catalysts and/or (e) customary auxiliary and/or adjuvant materials.

The starting components and methods of preparing the preferred polyurethanes will now be set out by way of example. The customary components for preparing polyurethanes—(a), (b) plus optionally (c), (d) and/or (e)—will now be described by way of example:

a) Useful organic isocyanates (a) include commonly/generally known aliphatic, cycloaliphatic, araliphatic and/or aromatic isocyanates, preferably diisocyanates, examples being tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or 2,6-cyclohexane diisocyanate and/or 4,4'-, 2,4'- and 2,2'-dicyclohexylmethane diisocyanate, 2,2'-, 2,4'- and/or 4,4'-diphenylmethane diisocyanate (MDI), 1,5-naphthylene diisocyanate (NDI), 2,4- and/or 2,6-tolylene diisocyanate (TDI), diphenylmethane diisocyanate, 3,3'-dimethylbiphenyl diisocyanate, 1,2-diphenylethane diisocyanate and/or phenylene diisocyanate.

b) Useful isocyanate-reactive compounds (b) include the commonly/generally known isocyanate-reactive compounds, examples being polyesterols, polyetherols and/or polycarbonate diols, which are typically also subsumed under the term "polyols", with molecular weights of 500 to 8000, preferably 600 to 6000, especially 800 to 4000, and preferably an average functionality of 1.8 to 2.3, preferably 1.9 to 2.2, especially 2.

c) Useful chain-extending agents (c) include commonly/generally known aliphatic, araliphatic, aromatic and/or cycloaliphatic compounds having a molecular weight of 50 to 499, preferably 2-functional compounds, examples being diamines and/or alkanediols having 2 to 10 carbon atoms in the alkylene moiety, especially 1,4-butanediol, 1,6-hexanediol and/or di-, tri-, tetra-, penta-, hexa-, hepta-, octa-, nona- and/or decaalkylene glycols having 3 to 8 carbon atoms, preferably the corresponding oligo- and/or polypropylene glycols, and mixtures of chain extenders are also employable.

d) Useful catalysts to hasten specifically the reaction between the NCO groups of diisocyanates (a) and the hydroxyl groups of constitutive components (b) and (c) include the tertiary amines known and customary in the prior art, examples being triethylamine, dimethylcyclohexylamine, N-methylmorpholine, N,N'-dimethylpiperazine, 2-(dimethylaminoethoxy)ethanol, diazabicyclo-(2,2,2)-octane and the like and also specifically organometallic compounds such as titanic esters, iron compounds, e.g., iron(III) acetylacetonate, tin compounds, e.g., tin diacetate, tin dioctoate, tin dilaurate or the tin dialkyl salts of aliphatic carboxylic acids such as dibutyltin diacetate, dibutyltin dilaurate or the like. Catalysts are typically used in amounts of 0.0001 to 0.1 part by weight per 100 parts by weight of polyhydroxyl compound (b).

e) Customary auxiliaries and/or adjuvant materials (e) may also be added to the constitutive components (a) to (c) alongside catalysts (d). Examples include blowing agents, surface-active substances, fillers, flame retardants, nucleating agents, oxidation stabilizers, lubricating and demolding aids, dyes and pigments, optionally, in addition to the stabilizer mixture of the present invention, further stabilizers, for example against hydrolysis, light, heat or discoloration, organic and/or inorganic fillers, reinforcing agents and plasticizers. In one preferred embodiment, component (e) also subsumes hydrolysis control agents such as, for example, polymeric and low molecular weight carbodiimides. In a further embodiment, the TPU may comprise a phosphorus compound. One preferred embodiment utilizes organophosphorus compounds of trivalent phosphorus, examples being phosphites and phosphonites. Examples of suitable phosphorus compounds are triphenyl phosphite, diphenyl alkyl phosphite, phenyl dialkyl phosphite, tris(nonylphenyl) phosphite, trilauryl phosphite, trioctadecyl phosphite, distearylpentaerythritol diphosphite, tris(2,4-di-tert-butylphenyl) phosphite, diisodecylpentaerythritol diphosphite, di(2,4-di-tert-butylphenyl)pentaerythritol di phosphite, tristearylsorbitol triphosphite, tetrakis(2,4-di-tert-butylphenyl)-4,4'-biphenylylene diphosphonite, trisisodecyl phosphite, diisodecyl phenyl phosphite and diphenyl isodecyl phosphite or mixtures thereof.

Phosphorus compounds are particularly useful when they are difficult to hydrolyze, since the hydrolysis of a phosphorus compound to the corresponding acid may lead to damage being inflicted on the polyurethane, especially the polyester urethane. Accordingly, phosphorus compounds that are particularly difficult to hydrolyze are suitable for polyester urethanes in particular. Examples of such phosphorus compounds are dipolypropylene glycol phenyl phosphite, triisodecyl phosphite, triphenyl monodecyl phosphite, trisisononyl phosphite, tris(2,4-di-tert-butylphenyl) phosphite, tetrakis(2,4-di-tert-butylphenyl)-4,4'-diphenylylene diphosphonite and di(2,4-di-tert-butylphenyl)pentaerythritol diphosphite or mixtures thereof.

Useful fillers include organic and inorganic powders or fibrous materials and also mixtures thereof. Useful organic fillers include, for example, wood flour, starch, flax fibers, hemp fibers, ramie fibers, jute fibers, sisal fibers, cotton fibers, cellulosic fibers or aramid fibers. Useful inorganic fillers include, for example, silicates, barite, glass balls, zeolites, metals or metal oxides. Preference is given to pulverulent inorganics, such as talc, chalk, kaolin $(Al_2(Si_2O_5)(OH)_4)$, aluminum hydroxide, magnesium hydroxide, aluminum nitrite, aluminum silicate, barium sulfate, calcium carbonate, calcium sulfate, silica, quartz flour, aerosil, argillaceous earth, mica or wollastonite or spherical or fibrous inorganics, such as iron powder, glass balls, glass fibers or carbon fibers. The average particle diameter or, in the case of fibrous fillers, the length should be in the region of the cell size or less. Preference is given to an average particle diameter in the range from 0.1 to 100 µm, preferably in the range from 1 to 50 µm.

Useful organic fillers further include polymers in the form of nonmelting beads or meltable polymeric components that form a blend with the base polymer. Preferred meltable polymers include, for example, polyethylene, polypropylene, polystyrene, SAN and EVA, while preferred nonmelting polymers are partly or wholly crosslinked polymers such as rubber. Preference is given to thermoplastic polyurethanes comprising between 5 to 80 wt % of organic and/or inorganic fillers, based on the overall weight of the thermoplastic polyurethane.

Besides the recited components a) and b) and optionally c), d) and e) it is further also possible to employ chain transfer agents, typically having a molecular weight of 31 to 499. Chain transfer agents of this type are compounds having merely one isocyanate-reactive functional group, for example monofunctional alcohols, monofunctional amines and/or monofunctional polyols. Chain transfer agents of this type may be used to precisely establish a type of flowability, especially in relation to TPUs. Chain transfer agents are generally employable in an amount of 0 to 5, preferably 0.1 to 1, parts by weight, based on 100 parts by weight of component b), and by definition come within component c).

Stated molecular weights refer to the number average Mn, in g/mol, unless otherwise stated.

To adjust TPU hardness, the constitutive components (b) and (c) may be varied within relatively wide molar ratios. Molar ratios of from 10:1 to 1:10, in particular of from 1:1 to 1:4, for component (b) to total chain-extending agent (c) will be found advantageous, TPU hardness increasing with increasing (c) content.

Chain extenders (c) are preferably also used to prepare the TPUs.

The reaction can be carried out at customary index numbers, preferably at an index number of 60 to 120, more preferably at an index number of 80 to 110. The index number is defined by the ratio of total component (a)

isocyanate groups employed in the reaction to the isocyanate-reactive groups, i.e., the active hydrogens, of components (b) and (c). When the index number is 100, there is one active hydrogen atom, i.e., one isocyanate-reactive function, on the part of components (b) and (c) per isocyanate group of component (a). At index numbers above 100, there will be more isocyanate groups present than OH groups.

TPUs are obtainable in accordance with existing methods in a continuous manner, for example using reaction extruders or the belt method in one-shot mode or the prepolymer method, or batchwise by the familiar prepolymer process. In these methods, the reactant components (a), (b) and optionally (c), (d) and/or (e) may be mixed with one another in succession or at the same time, the reaction ensuing immediately.

In the extruder method, the constitutive components (a), (b) and also optionally (c), (d) and/or (e) are introduced into the reactor individually or as a mixture, reacted therein, for example at temperatures of 100 to 280° C., preferably 140 to 250° C., and the TPU obtained is extruded, cooled down and pelletized. It may perhaps be advantageous for the TPU obtained to be annealed at from 80 to 120° C., preferably 100 to 110° C. for a period of 1 to 24 hours before further processing.

The gas in the cells of the hollow beads is preferably oxygen, nitrogen, argon, carbon dioxide or a mixture thereof.

Useful bead shapes include tetrahedra, cylinders, spheres, lentoids or simplexes such as cubes or octahedra. The hollow beads preferably take the form of hollow cylinders or hollow tetrahedra obtainable by fusing together a hose or a self-supporting film/sheet in the thermoplastic elastomer. The bulk properties of the hollow beads are similar to those of foam beads. In contradistinction to the latter, however, they have distinctly fewer and in return larger cells. In the preferred embodiment, featuring just one cell per hollow bead, their construction corresponds to that of a small, air-filled tennis ball. So the hollow bead in question is a thick-walled, completely hollow bead obtainable by sealcutting from a hose or a self-supporting film/sheet in thermoplastic elastomer, similar to a blister film in polyethylene having segregated chambers of air, and subsequent punchcutting out of the hollow beads.

In a further possible procedure for practice on a large industrial scale, a melt is extruded through an annular die followed by continuous face-cutting of the gas-filled hollow bodies. Hollow bodies from film/sheet are obtainable by thermoforming a film/sheet and then contact sealing with a covering film/sheet, or else alternatively in a continuous manner from two films/sheets using an embossing roll. Multilayered films/sheets or hoses may also be employed, having for example a low-melting layer on the outside and a higher-melting core on the inside. Hoses or multilayered films/sheets are obtainable directly in the course of extrusion from a multicomponent extruder or by subsequent coating with some other polymer, with a hot-melt adhesive or with a lower-melting polyurethane.

Shaped Porous Articles:

The invention also provides the method of using the above-described hollow beads in the manufacture of shaped porous articles and the method of manufacturing shaped porous articles by thermally bonding or adhering together hollow beads. Said thermal bonding together may be effected by fusion using steam or hot air or high-energy waves, especially microwaves after prior application of appropriate absorbents, for example polar liquids such as glycerol triacetate. Hollow beads having a comparable size to commercial types of bead foam (about 2-15 mm diameter) are processable with machines similarly to the molded part production from bead foams. When the hollow bodies are larger, processing by adhering together or foaming in is preferred. Manual processing by cold fusion is likewise possible.

The shaped porous articles obtainable by this method are preferably from 50 to 500 kg/m$^3$ and more preferably from 100 to 300 kg/m$^3$ in density.

Useful binders include polymeric binders, such as melamine-formaldehyde resins, polyurethane resins, polyester resins or epoxy resins. Resins of this type are found for example in Encyclopedia of Polymer Science and Technology (Wiley) under the following chapter headings: a) Polyesters, unsaturated: Edition 3, Vol. 11, 2004, pp. 41-64; b) Polyurethanes: Edition 3, Vol. 4. 2003, PP. 26-72 and c) Epoxy resins: Edition 3, Vol. 9, 2004, pp. 678-804. Further Ullmann's Encyclopedia of Industrial Chemistry (Wiley) contains the following chapters: a) Polyester resins, unsaturated: Edition 6, Vol. 28, 2003, pp. 65-74; b) Polyurethanes: Edition 6, Vol. 28, 2003, pp. 667-722 and c) Epoxy resins: Edition 6, Vol. 12, 2003, pp. 285-303. It is further possible to employ amino- or hydroxyl-functionalized polymers, especially a polyvinylamine or polyvinyl alcohol. Examples based on melamine and phenolic resin and also acrylamide are described in EP 0451535B1 and DE 19649796A1.

The binders are employable in the form of solutions or dispersions. Preference is given to employing binders that are compatible with the hollow beads and have comparable mechanical properties. It is particularly preferable for the binder to have a not less than 50% elongation at break and a tensile strength of not less than 5 MPa.

The proportion of hollow beads is preferably in the range from 60 to 90 wt %, based on the shaped porous article. The shaped porous article preferably consists essentially of hollow beads and a matrix of polyurethane such that the resulting proportion of polyurethane adhesive used and/or polyurethane matrix formed is from 10 to 40 wt %, based on shaped porous article.

Adhering the hollow beads together using a polyurethane adhesive as binder produces shaped porous articles wherein a matrix formed of a polyurethane adhesive embeds the hollow beads. By adhering via a foamable mixture of polyurethane it is also possible to obtain shaped porous articles wherein a matrix of a polyurethane foam embeds the hollow beads. The matrix of polyurethane or polyurethane foam is preferably formed from at least one aromatic diisocyanate and at least one polyol.

When the polymer matrix consists of a polyurethane foam, the shaped article can in principle be referred to as being of a 'foam-in-foam' type, consisting of a dense bed of hollow beads where a foam fills the interstitial spaces. It is particularly preferable for the matrix to consist of a polyurethane foam when a particularly low thermal conductivity is to be achieved.

The polyurethane foam matrix is preferably closed-cell, i.e., they have a closed-cell content of not less than 90% and preferably of not less than 95%.

Polyurethane Adhesive as Binder to Form the Matrix of the Shaped Porous Article

The shaped porous articles of the present invention comprise a matrix in the form of a preferably foamed or unfoamed polyurethane obtainable by reaction of an isocyanate with an isocyanate-reactive compound in the presence or absence of a blowing agent. The mixture of components to form the polyurethane matrix is hereinafter also referred to as the reactive polyurethane mixture. Preference is given to using components familiar to a person skilled in the art of preparing polyurethane elastomers.

Useful components for the polyurethane binder include those described above for preparing the thermoplastic polyurethanes, namely isocyanates (a), isocyanate-reactive compounds (b), chain-extending agents (c), catalysts (d) and adjuvants (e).

Preferred isocyanates for the binder are diphenylmethane diisocyanates (MDI), especially 4,4'-MDI, 2,4'-MDI, polymeric MDI, TDI, HDI, trimerized HDI, IPDI, H12MDI and mixtures thereof. The polymeric MDI (PMDI) used is in particular that having a viscosity of 10-10 000 mPas, especially 20-5000 mPas, measured at 25° C. to DIN53018. Very particularly preferred types have a viscosity between 50 and 1000 mPas.

The isocyanate-reactive compounds used are preferably 2-3-functional polyols such as polypropylene glycols (Lupranol® 1000, Lupranol® 1100 and Lupranol® 1200) having average molecular weights Mw in the range of 200-5000 g/mol, polytetrahydrofuran, aliphatic polyester polyols having average molecular weights Mw in the range of 500-3000, flexible-foam polyols or castor oil.

The chain extenders used are preferably butanediol, ethylene glycol, diethylene glycol, triethylene glycol, propylene glycol or dipropylene glycol.

The crosslinkers used are preferably TMP, glycerol or short-chain amines.

Chain-extending agents, crosslinking agents or mixtures thereof are advantageously employed in an amount of 1 to 20 wt %, preferably 2 to 5 wt %, based on the polyol component.

Blowing Agent:

The polyurethane foam matrix is typically formed in the presence of blowing agents. The blowing agent used may preferably be water, which reacts with isocyanate groups to evolve carbon dioxide. Formic acid is a further frequently employed chemical blowing agent, reacting with isocyanate to release carbon monoxide and carbon dioxide. Physical blowing agents are also employable in combination with or in lieu of chemical blowing agents. Physical blowing agents are compounds which are inert toward the feedstock components, usually liquid at room temperature and vaporize under the conditions of the urethane reaction. The boiling point of these compounds is preferably below 50° C. Physical blowing agents also include compounds which are gaseous at room temperature and under pressure are imported and/or dissolved in the feedstock components, examples being carbon dioxide, alkanes, especially low-boiling alkanes and fluoralkanes, preferably alkanes, especially low-boiling alkanes and fluoralkanes.

The physical blowing agents are usually selected from the group comprising alkanes and/or cycloalkanes having at least 4 carbon atoms, dialkyl ethers, esters, ketones, acetals, fluoroalkanes having 1 to 8 carbon atoms and tetraalkylsilanes having 1 to 3 carbon atoms in the alkyl chain, especially tetramethylsilane.

Examples are propane, n-butane, isobutane, cyclobutane, n-pentane, isopentane, cyclopentane, cyclohexane, dimethyl ether, methyl ethyl ether, methyl butyl ether, methyl formate, acetone, and also fluoroalkanes that have broken down in the troposphere and therefore do not deplete the ozone layer, such as trifluoromethane, difluoromethane, 1,1,1,3,3-pentafluorobutane, 1,1,1,3,3-pentafluoropropane, 1,1,1,2,3-pentafluoropropene, 1-chloro-3,3,3-trifluoropropene, 1,1,2-tetrafluoroethane, difluoroethane and 1,1,1,2,3,3,3-heptafluoropropane, and also perfluoroalkanes, such as C3F8, C4F10, C5F12, C6F14, and C7F16. Particular preference is given to pentanes, especially cyclopentane. The physical blowing agents mentioned are employable alone or in any desired combination with each other.

One preferred embodiment of the invention utilizes a mixture of physical and chemical blowing agents. Particular preference is given to mixtures of physical blowing agents and water, especially mixtures of hydrocarbons and water. Of the hydrocarbons, it is the pentanes and especially the cyclopentane which are particularly preferable.

Preparation of Polyurethane Binders

To form the isocyanate-based foams, the polyisocyanates and the compounds having two or more isocyanate-reactive hydrogen atoms are reacted in such amounts that the isocyanate index in the case of polyurethane foams is in a range between 100 and 220, preferably between 115 and 180. Polyurethane foams are obtainable batchwise or continuously using known mixing means.

To produce polyisocyanurate foams, the index can also be >180, preferably 300-400.

The starting components can be mixed using known mixing means.

Polyurethane foams are typically formed by the two-component method. In it, the components having two or more isocyanate-reactive hydrogen atoms, the blowing agents, the catalysts and also the further auxiliary and/or adjuvant materials are mixed together to form a so-called polyol component which is reacted with the polyisocyanates or mixtures of the polyisocyanates and any blowing agents, also known as the isocyanate component.

The starting components are usually mixed at a temperature of 15 to 50° C., preferably at from 20 to 30° C. The reaction mixture can be mixed using high- or low-pressure metering machines.

The density of the rigid-foam matrix obtained at this stage, the so-called free-rise density of the foam, is preferably in the range from 30 to 500 kg/m$^3$.

Preparation of Porous Moldings

To produce the porous moldings of the invention, the hollow beads may for example be initially charged in such a way that they can subsequently not be forced apart to any significant extent, if at all, by the foamed or unfoamed reactive polyurethane resin mixture. Useful equipment for this purpose includes, for example, a firmly closable mold close-packed to the top, or a twin-belt laminator where the height of the packing coincides with the processing height of the laminator.

The foamed or unfoamed reactive polyurethane resin mixture is admixed so as not to exceed a 20 wt %, preferably 15 wt %, weight fraction of binder in the porous molding yet all the hollow pellets are firmly adhered together.

In the case of a compact matrix of unfoamed polyurethane, the hollow beads are stirred up with the reactive polyurethane mixture before being introduced into the appropriate mold and cured.

In the case of a matrix of foamed polyurethane, the reactive expandable polyurethane mixture is poured uniformly over the provided packing of hollow beads, and reacted, without the foaming process forcing the individual hollow beads apart to any significant extent.

Foamable reactive polyurethane mixtures should have a high level of flowability and a relatively long reaction time in order that the flowable polyurethane reaction mixture may wet the cavities between the individual hollow beads and expand into them on foaming. Sufficiently long reaction times can be established via the type and amount of catalyst used. To obtain sufficiently high curing of the reaction mixture even at low amounts of catalysts or even without catalyst, the mold in which the reaction takes place can be heated to appropriately high temperatures.

When the foam system used is expanded in an open mold, its fiber time should be not less than 60 seconds, preferably not less than 90 seconds and more preferably not less than 120 seconds. In order to compensate for the absence of heat through a heated mold it is possible for example to employ a polyurethane-customary mixture of amine catalysts in order to achieve comparable reaction times.

Prior to the adhering step, the hollow beads may be coated with various adjuvant materials, for example flame retardants, catalysts.

A particularly preferred method of producing the porous molding of the invention comprises the steps of
a) introducing hollow beads into a heatable and closable mold having deaeration apertures,
b) wetting the hollow beads with a reactive polyurethane resin mixture optionally comprising blowing agent,
c) closing the mold, the volume of the closed mold being predetermined by the closest packing of the hollow beads, and
d) curing and demolding.

Thermal Bonding

The hollow beads of the invention are useful for producing foams, for example by fusing them together in a closed mold under the application of heat. To this end, the beads are introduced into the mold, the mold is closed and then steam or hot air is introduced, causing the beads to expand somewhat and fuse together to form a foam, preferably having a density in the range from 30 to 600 g/l. The foams may be semi-finished products, for example sheets, profiles or sheetings, or ready-produced moldings of simple or complicated geometry. The term TPU foam accordingly comprehends ready-produced and semi-finished foam moldings.

The temperature at which the hollow TPU beads are fused together is preferably between 100° C. and 160° C. The present invention thus also provides methods of producing foam on the basis of thermoplastic polyurethane wherein the expanded thermoplastic polyurethane of the invention is fused into a shaped article using steam at a temperature between 100° C. and 160° C.

The invention also provides the method of using the hollow beads of the invention in the manufacture of TPU foams as well as TPU foams obtainable from the hollow beads of the invention.

The foams of the invention are readily recyclable in a thermoplastic manner. To this end, the hollow beads are extruded by using an extruder having a devolatilizer, this extrusion optionally being preceded by a step of mechanical comminution. Thereafter, they may be processed again into hollow beads and/or foams in the manner described above.

Processing

The shaped porous article of the invention may have at least one outer layer laminated onto at least one side in order to improve the properties of the surface, for example to increase robustness, or to configure the surface as a vapor barrier or protect it against easy soilability. The outer layers may also serve to improve the mechanical stability of the shaped porous article. Outer layers used on both the faces may be the same or different.

Any of the materials known to a person skilled in the art are useful as outer layers. They may be aporous and hence act as a vapor barrier, examples being polymeric foils, preferably metalized polymeric foils to reflect thermal radiation. However, it is also possible to use outer layers which are porous to allow air to penetrate into the material, examples being porous foils, papers, wovens or nonwovens.

The surface of the composite material may also be coated with a material in order to modify the haptics of the composite material.

An applied layer may further be used to improve adherence to other substrates. Moisture uptake may be reduced by applying a suitable layer. Such a layer may also consist of a reactive system such as, for example, epoxy resins or polyurethanes, and these may optionally be applied by spraying, doctor coating, casting or spreading or the like.

The outer layers may themselves also consist of two or more layers. The reactive polyurethane mixture used for forming the matrix may be used to secure the outer layers, but it is also possible to use some other adhesive.

The surface of the composite material may also be rendered uninterrupted and consolidated by introducing at least one suitable material into a surface layer. Suitable materials include, for example, thermoplastic polymers, e.g., polyethylene and polypropylene, or resins such as, for example, melamine-formaldehyde resins.

The hollow beads of the invention further process by adhesion or fusion into shaped porous articles which, although comparable in their mechanical properties to those of fused foam beads in thermoplastic elastomer as described in WO 2007/082838, for example, are transparent and thick-walled. The method of the invention provides a way to achieve thicker cell walls coupled with a low component part weight.

Use

The shaped porous articles of the invention are useful for a very wide variety of applications. Owing to its elastomeric properties, the shaped porous article of the invention is useful for applications in the sports, footwear and packaging sectors, for example for as soles for sports or safety shoes or as packaging for electronic components or devices. The shaped porous articles are employed with preference as cushioning elements in shoes, sports equipment, automobiles or machines.

EXAMPLES

The examples and comparative tests utilized the following components as defined in Table 1:

TABLE 1

| Code | Composition |
|---|---|
| E-TPU1 | (Infinergy ® 32-100 U10) expanded, overwhelmingly closed-cell foam beads based on thermoplastic polyurethane, obtained by expanding pelletized, blowing agent-containing TPU1 under pressure and high temperature, bulk densities 110 g/l. |
| E-TPU2 | (Infinergy ® 32-150 U10) expanded, overwhelmingly closed-cell foam beads based on thermoplastic polyurethane, obtained by expanding pelletized, blowing agent-containing TPU1 under pressure and high temperature, bulk densities 150 g/l. |
| TPU1 | thermoplastic polyether polyurethane having a Shore hardness of 80A based on PTHF1000, 1,4-butanediol, 4,4'-MDI |
| TPU2 | thermoplastic polyether polyurethane having a Shore hardness of 85A based on PTHF1000, 1,4-butanediol, 4,4'-MDI |
| K1 | Elastopave 6550/101 from BASF Polyurethanes GmbH, compact, 2-component polyurethane adhesive system. |
| HP1 | TPU1 tetrahedra having an edge length of 12 mm and a bulk density of 160 g/l |
| HP2 | TPU1 cylinders having a length of 15 mm, a diameter of 5.4 mm and a bulk density of 320 g/l |
| HP3 | TPU2 tetrahedra having an edge length of 12 mm and a bulk density of 150 g/l |

Apparatus:

Brabender laboratory extruder to produce the TPU hoses

Hot-wire laboratory sealing apparatus for sealing off the shaped TPU articles out of the TPU hoses and films/sheets Methods of Measurement:

To determine bulk density, a 200 ml vessel was filled with beads and weighed. An accuracy of ±5 g/l may be presumed.

The densities of the shaped porous articles were determined to DIN EN ISO 1183-1, A.

The compression load deflection of the shaped porous articles was measured in accordance with DIN EN ISO 3386 at 10%, 25%, 50% and 75% compression.

The compression set of the shaped porous articles was measured to ASTM D395 after conditioning (6 h/50° C./50%).

The rebound resilience of the shaped porous articles was determined to DIN 53512.

Elongation at break and tensile strength were determined to DIN 53504.

Preparation of Hollow TPU Beads HP1 to HP3

Setup of Brabender single-screw laboratory extruder with hose die, takeoff belt and water bath. Extruder type: Brabender Extrusiograph E 19/25 D (19 mm screw diameter)
 Three-zone screw, no sieves
 Screw speed=25 rpm
Temperature Profile for TPU1 and TPU2:
 zone 1: 180° C., zone 2: 190° C., zone 3: 200° C., zone 4: 190° C., hose head: 190° C. (TPU1) or 200° C. (TPU2)
 Drying of TPU pellet in circulating air oven at 110° C. for 3 h.

The laboratory extruder was used to convert TPU1 and TPU2 into transparent hoses having an outside diameter of 5.4 mm and a wall thickness of 1.0 mm and also transparent hoses having an outside diameter of 5.0 mm and a wall thickness of 0.2 mm.

The thin-walled hoses obtained were processed using a Qigg laboratory sealer into tetrahedra having an edge length of 12 mm, while the thick-walled hoses were processed with a Kapp handsealer into cylinders having an average length of 15 mm.

Preparation of Shaped Porous Articles

In each case, 100 parts by weight of the hollow beads HP1 to HP3 and/or of the comparative products E-TPU1 and E-TPU2 were mixed as reported in Table 1 with an additional 20 or, respectively, 30 parts by weight of the 2-component PU adhesive K1 and processed into cube-shaped porous articles having an edge length of 44 mm. To this end, the hollow beads HP1 to HP3 and/or the comparative products E-TPU1 and E-TPU 2 were introduced into a PE container, the corresponding amount of components 1 and 2 of adhesive 1 were weighed in, intensively mixed, applied to the hollow beads, intensively mixed therewith and the mixture poured into a foldable mold having an internal edge length of 44 mm.

After the adhesive had cured, the shaped article was demolded and its density determined by the procedure described above.

TABLE 1

Measured results on shaped porous articles formed from adhered hollow beads of Examples 1 to 3 and Comparative Tests 1 and 2

| | V1 | V2 | B1 | B2 | B3 |
|---|---|---|---|---|---|
| beads | E-TPU1 | E-TPU2 | HP1 | HP2 | HP3 |
| add of PU adhesive K1 [parts by weight] | 30 | 20 | 20 | 20 | 20 |
| bulk density of hollow beads at 23° C. [kg/m$^3$] | 80 | 150 | 160 | 320 | 150 |
| 10% compression load deflection [kPa] | 29.8 | 56.8 | 69.7 | 156.7 | 60.8 |
| 25% compression load deflection [kPa] | 57.7 | 110.1 | 128.5 | 381 | 109.4 |
| 50% compression load deflection [kPa] | 135.6 | 254.7 | 286.2 | 1043.4 | 246.3 |
| 75% compression load deflection [kPa] | 485.8 | 1051.2 | 1574.9 | 9299 | 1381.2 |
| density of shaped article [kg/m$^3$] | 130.9 | 192.4 | 265.6 | 467.2 | 232.6 |
| compression set [%] | 50 | 32.1 | 19.6 | 25.8 | 19.1 |
| rebound resilience [%] | 65 | 67 | 59 | 56 | 64 |

The shaped articles of Examples B1 to B3, which are in accordance with the present invention, display a significantly higher compression load deflection and lower compression set versus the Comparative Tests V1 and V2.

We claim:

1. A method of manufacturing shaped porous articles, comprising employing hollow beads comprising a skin of thermoplastic elastomer and a gas-filled cell, wherein the skin of the hollow beads has a wall thickness in the range from 0.02 to 2 mm.

2. The method according to claim 1, wherein the hollow beads have a bulk density in the range from 30 to 500 kg/m$^3$.

3. The method according to claim 1, wherein the hollow beads have a mean bead diameter in the range from 2.5 to 25 mm.

4. The method according to claim 1, wherein the gas-filled cell has a volume in the range from 1 to 10,000 mm$^3$.

5. The method according to claim 1, wherein the thermoplastic elastomer is selected from the group consisting of thermoplastic polyurethanes (TPUs), thermoplastic polyesters (TPEs), thermoplastic polyether block amides (PEBAs) and thermoplastic styrene-butadiene block copolymers (TPSs).

6. The method according to claim 1, wherein the cell comprises oxygen, nitrogen, argon, carbon dioxide or mixtures thereof.

7. The method according to claim 1, comprising thermally bonding or adhering the hollow beads together.

8. The method according to claim 7, wherein the hollow beads are fused together using hot air, steam, electrical energy or high-energy radiation.

9. A shaped porous article obtained by the method according to claim 7.

10. The shaped porous article according to claim 9, having a density in the range from 50 to 500 kg/m$^3$.

11. The shaped porous article according to claim 9, wherein the hollow beads are embedded in a matrix formed of a polyurethane adhesive.

12. The shaped porous article according to claim 9, wherein the hollow beads are embedded in a matrix formed of a polyurethane foam.

13. A method, comprising employing the shaped porous articles according to claim 9 as cushioning elements in shoes, sports equipment, automobiles or machines.

* * * * *